(12) United States Patent
Kim et al.

(10) Patent No.: US 9,311,196 B2
(45) Date of Patent: Apr. 12, 2016

(54) METHOD AND APPARATUS FOR MANAGING CONNECTION PATH FAILURE BETWEEN DATA CENTERS FOR CLOUD COMPUTING

(71) Applicant: Electronics and Telecommunications Research Institute, Daejeon (KR)

(72) Inventors: Doyeon Kim, Daejeon (KR); Taesang Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 466 days.

(21) Appl. No.: 13/735,279

(22) Filed: Jan. 7, 2013

(65) Prior Publication Data

US 2014/0006843 A1   Jan. 2, 2014

(30) Foreign Application Priority Data

Jun. 29, 2012   (KR) ........................ 10-2012-0071134

(51) Int. Cl.
*G06F 11/20* (2006.01)
*H04L 29/14* (2006.01)
*H04L 12/26* (2006.01)
*H04L 12/24* (2006.01)
*H04L 29/08* (2006.01)

(52) U.S. Cl.
CPC ........ *G06F 11/2002* (2013.01); *H04L 41/0663* (2013.01); *H04L 41/5096* (2013.01); *H04L 43/10* (2013.01); *H04L 69/40* (2013.01); *H04L 67/10* (2013.01)

(58) Field of Classification Search
CPC . G06F 11/00; H04L 41/0663; H04L 41/5096; H04L 41/10
See application file for complete search history.

(56) References Cited

U.S. PATENT DOCUMENTS

| 7,652,983 | B1* | 1/2010 | Li et al. ........................ 370/217 |
| 7,940,753 | B2 | 5/2011 | Dolganow |
| 2009/0161669 | A1* | 6/2009 | Bragg ................... H04L 12/462 370/389 |
| 2011/0166835 | A1 | 7/2011 | Devarakonda et al. |
| 2012/0110186 | A1* | 5/2012 | Kapur et al. .................. 709/226 |
| 2012/0207014 | A1* | 8/2012 | Saltsidis et al. ............... 370/218 |
| 2012/0300617 | A1* | 11/2012 | Ao ........................... H04B 1/74 370/218 |
| 2012/0307826 | A1* | 12/2012 | Matsuoka ............... H04L 49/70 370/390 |
| 2014/0136908 | A1* | 5/2014 | Maggiari .............. H04L 12/462 714/712 |

FOREIGN PATENT DOCUMENTS

WO   2010/030428 A1   3/2010

* cited by examiner

*Primary Examiner* — Omer S Mian
(74) *Attorney, Agent, or Firm* — Nelson Mullins Riley & Scarborough LLP (57) ABSTRACT

A first cloud computing data center and a second cloud computing data center are connected through a provider backbone bridge network (PBBN), and a plurality of working connection paths and protection connection paths are formed between end points between the first cloud computing data center and the second cloud computing data center and between end points within a cloud computing data center through the PBBN. When a failure occurs in the working connection path, the working connection path is switched to a corresponding protection connection path.

8 Claims, 6 Drawing Sheets

METHOD AND APPARATUS FOR MANAGING CONNECTION PATH FAILURE BETWEEN DATA CENTERS FOR CLOUD COMPUTING

CROSS-REFERENCE TO RELATED APPLICATION

This application claims priority to and the benefit of Korean Patent Application No. 10-2012-0071134 filed in the Korean Intellectual Property Office on Jun. 29, 2012, the entire contents of which are incorporated herein by reference.

BACKGROUND OF THE INVENTION (a) Field of the Invention

The present invention relates to a method and apparatus for managing a connection path failure. More particularly, the present invention relates to a method and apparatus for managing a connection path failure between cloud computing data centers.

(b) Description of the Related Art

Cloud computing is a kind of distributed computing environment of a service form that moves an individually existing plurality of computing resources to one area, for example, a cloud area, which is an Internet environment having a computing function, and that enables a user to use a necessary computing resource by connecting to the Internet at any time and place using a terminal and that selectively performs accounting. In the cloud area, a plurality of physical or logical servers exist as a resource, and this is referred to as a cloud resource. The cloud resources are connected to each other through a network.

For an efficient cloud computing service, a data center for managing a cloud resource is requested. Nowadays, in order to efficiently manage a large-scale resource, server virtualization technology in which a data center makes a host to a virtual machine (VM) and allocates the host to a server is applied. By server virtualization, one server supports several hundred VMs or more. When a VM of the host is allocated to an overloaded server, VM migration that reallocates the VM to a server with less load should occur between servers within a data center or between data centers through a core network. In this case, a large capacity packet such as a VM image file should be transmitted, and a communication delay time of a server should not deviate from an estimated range and not cause damage.

Further, nowadays, because data traffic between servers has rapidly increased, high speed networking construction and management between cloud computing data centers is necessary. Particularly, when a failure occurs in a connection path for packet transmission, high speed networking is not performed and thus a replacement processing of failure occurrence is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for managing a connection path failure having advantages of efficiently processing a failure occurring in a connection path for virtual machine migration and packet transmission between data centers in cloud computing.

An exemplary embodiment of the present invention provides a method of managing a connection path failure, wherein a first cloud computing data center and a second cloud computing data center are connected through a provider backbone bridge network (PBBN), the method including: forming a plurality of working connection paths and protection connection paths between end points between the first cloud computing data center and the second cloud computing data center through the PBBN and between end points within the cloud computing data center; exchanging a test message between the end points; determining that a failure has occurred at a corresponding working connection path when the test message is not received at a random end point; and switching the working connection path in which a failure has occurred to the protection connection path.

The data center may include a provider bridge (PB) device that is connected to the PBBN, and a switch that is connected to a plurality of servers including a plurality of virtual machines (VM). The forming of a plurality of working connection paths may include forming a connection path including the working connection path and the protection connection path based on a first virtual local access network (VLAN) between the VM and the switch, a second VLAN of the PB device, and a third VLAN and a fourth VLAN (I-SID) of a provider edge bridge (PEB) and a provider core bridge (PCB) that are included in the PBBN. Ethernet switched path (ESP) information including a destination address, a source address, and a VLAN identifier may be allocated to the connection path.

At a PEB ingress point, by frame-encapsulating VLAN identifiers of the third VLAN and the fourth VLAN I-SID, a connection path may be formed, and at a PEB egress point, by decapsulating VLAN identifiers of the third VLAN and the fourth VLAN I-SID, a connection path for VM migration may be set.

The forming of a plurality of working connection paths may further include setting operation and maintenance (OAM) attributes including generation of a maintenance domain (MD), a maintenance association (MA), and a maintenance end point (ME) to the connection paths.

The switching of the working connection path may include transmitting, by the random end point, a message representing that a working connection path is switched to the protection connection path, to a network management system (NMS) of a corresponding data center.

Another embodiment of the present invention provides an apparatus that manages a connection path failure at a random end point that is positioned within a cloud computing data center, wherein the cloud computing data center is connected to another data center through a PBBN, and a plurality of working connection paths and protection connection paths are formed between end points within the cloud computing data center or between end points of the other data center through the PBBN. The apparatus includes: a message exchange unit that exchanges a test message with an end point that is connected to a corresponding working connection path through the working connection path; a failure generation check unit that determines that a failure has occurred in a corresponding working connection path when the test message is not received from the connected end point; and a path switching unit that switches the working connection path in which a failure has occurred to a protection connection path.

The failure generation check unit may determine that a failure has occurred in the working connection path when the test message is not received within a preset time or when a kind of a frame of the received message does not correspond to a kind of the test message.

The path switching unit may notify a management system of the cloud computing data center of a message representing that a path was switched from the working connection path to the protection connection path.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a method and apparatus for managing a connection path failure between cloud computing data centers according to an exemplary embodiment of the present invention will be described.

Figure 1:
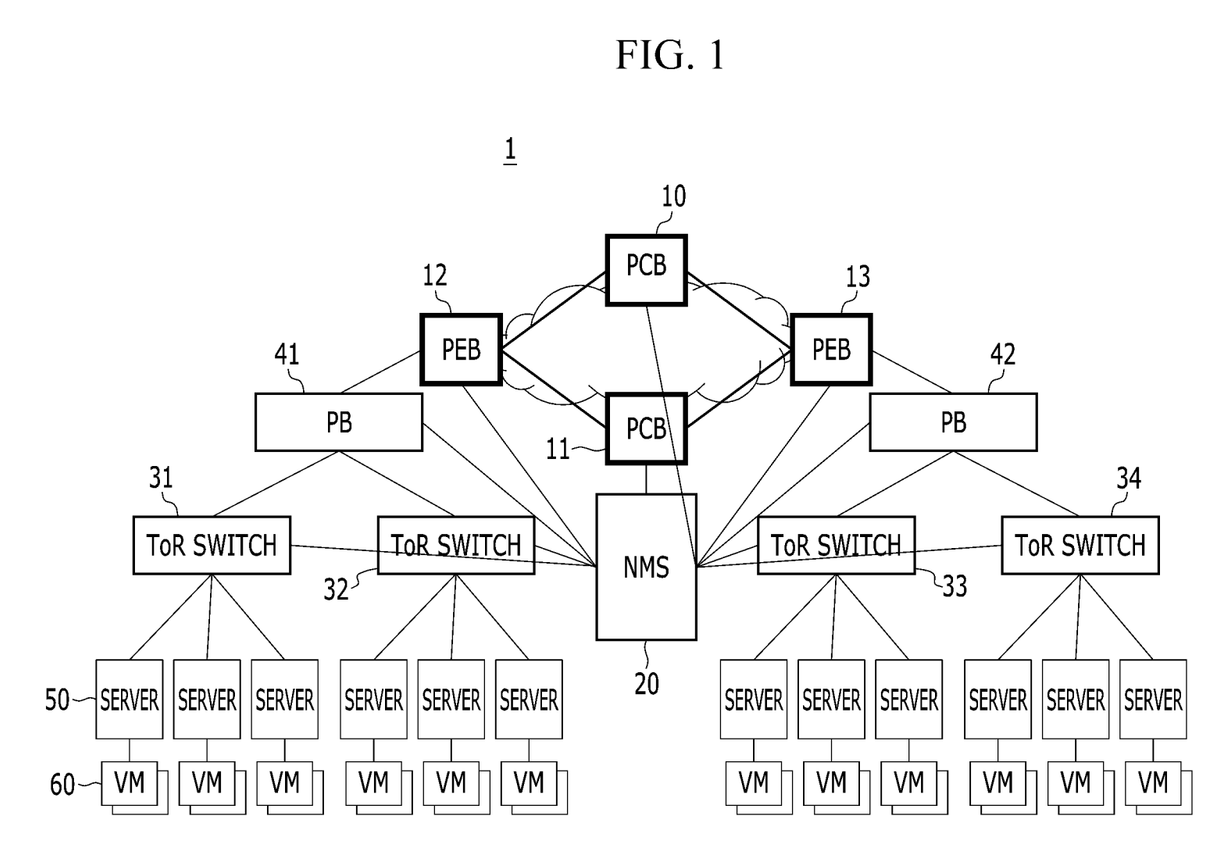
FIG. 1 is a diagram illustrating a structure of a cloud computing data center according to an exemplary embodiment of the present invention.

FIG. 1 is a diagram illustrating a structure of a cloud computing data center according to an exemplary embodiment of the present invention.

As shown in FIG. 1, a cloud computing data center 1 (hereinafter, for better comprehension and ease of description, referred to as a "data center") according to an exemplary embodiment of the present invention forms a provider backborn bridge network (PBBN) with provider core bridges (PCB) 10 and 11 that provide a provider core bridging function and provider edge bridges (PEB) 12 and 13 that provide a provider edge bridging function. These bridges 10, 11, 12, and 13 have, for example, 10G/40G/100G ethernet interface speed.

The data center 1 includes a network management system (NMS) 20, switch devices, i.e., top of rack (ToR) switches 31, 32, 33, and 34, and provider bridge (PB) devices 41 and 42, and the ToR switches are connected to a plurality of servers 50, respectively, and each server includes at least one virtual machine (VM) 60.

The PBs 41 and 42 provide a provider bridging function and perform a traffic line concentration function between the ToR switches 31, 32, 33, and 34. The PBs 41 and 42 have an extension field (e.g., VLAN 31 and 32 extension fields) necessary for identifying many VMs.

The ToR switches 31, 32, 33, and 34 process traffic of a plurality of servers 50 and a plurality of VMs 60, are access-class switches, and process a plurality of servers and a plurality of VM traffic. Servers are mounted in a rack, form a server group, and are connected through a ToR switch. Each server supports the VM 60 and includes a VM virtual switch for connecting VMs.

The NMS 20 performs control and management functions within the data center, and transmits/receives a control message for setting and managing a connection path to the ToR switches 31-34, the PB devices 41 and 42, and the PEBs 12 and 13. The NMS 20 includes an NMS provisioning manager, and manages cloud computing data center connection paths by the NMS provisioning manager.

The data center 1 having such a structure may be connected to another data center through the PBBN.

The NMS 20 of the data center 1 performs setting and management of a connection path, and sets a connection path through message exchange with a management agent (not shown) within the ToR switch, the PB device, and the PEB.

The connection path is set based on a virtual local access network (VLAN), and connection paths are set based on a C-VLAN between the VM 60 and the ToR switches 31-34, an S-VLAN of the PB devices 41 and 42, and a backbone service instance ID (I-SID) and a B-VLAN of the PEB and the PCB. Ethernet switched path (ESP) information including a destination address (DA), a source address (SA), and a VID, which is a VLAN identifier, is allocated to each VLAN. Connection paths based on each VLAN are mapped as shown in Table 1.

TABLE 1

| C-VID | S-VID | I-SID | B-VID |
|---|---|---|---|
|  | 42 | 3 | X |
|  | 32 |  |  |
|  | 33 |  |  |
| 61 | 41 | 4 |  |
| 62 |  |  |  |
| 51 | 31 |  |  |
| 52 |  |  |  |

Table 1 is an example illustrating identifier mapping of connection paths based on a VLAN, a C-VID is an identifier of a C-VLAN that is set to a VM and a ToR switch, an S-VID is an identifier of an S-VLAN that is set to a PB, and an I-SID and a B-VID are identifiers of an I-SID and a B-VLAN that are set to a PEB and a PCB, respectively, of a provider backbone network.

At a PEB ingress point, by frame-encapsulating the C-VID and the S-VID, a connection path is formed, and at a PEB egress point, by decapsulating the C-VID and the S-VID, a connection path for VM migration is set.

Figure 2:
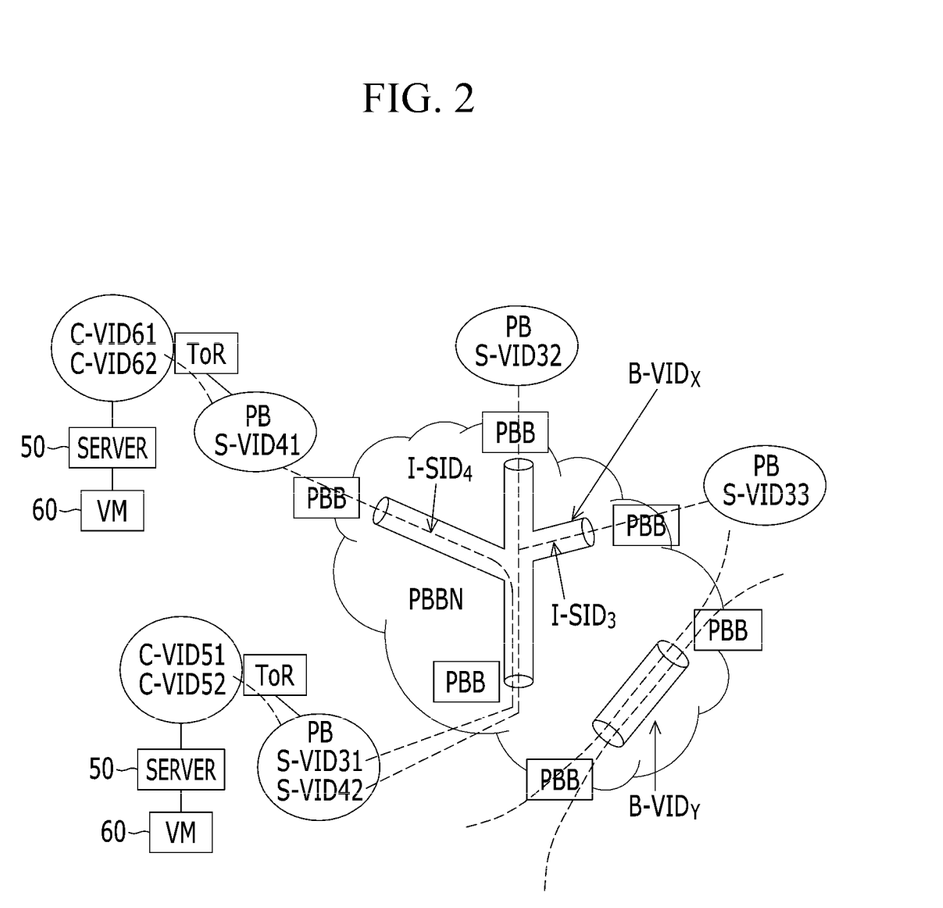
FIG. 2 is a diagram illustrating a connection path of a provider backbone bridge network based on VLAN ID mapping of Table 1.

A connection path of a provider backbone bridge network according to VLAN ID mapping according to Table 1 is displayed in FIG. 2.

FIG. 2 is a diagram illustrating a connection path of a provider backbone bridge network based on VLAN ID mapping of Table 1.

An I-SID and a B-VLAN that are formed in a provider backbone bridge edge (PBB), which is a PEB and a PCE constituting a provider backbone bridge network (PBBN), have an identifier B-VIDx.

Specifically, referring to Table 1, a PBBN connection path B-VIDx is formed with two PBB connection paths having backbone service identifiers I-SID3 and I-SID4, and I-SID3 is connected to a PB network having S-VID42, S-VID32, and S-VID33 VLANs. An I-SID4 PBB connection path is connected to a PB network having S-VID31 and S-VID41 VLANs, S-VID31 and S-VID41 PB networks are logically mapped to C-VID51, C-VID52, C-VID61, and C-VID62 VLAN IDs, respectively, and connection path setting and VM migration between data centers are performed.

As illustrated above, connection paths that are connected to another data center are formed through the PBBN based on VLANs. Connection paths that are connected to a data center through a PBBN for protection switching include a working connection path, which is a traffic path between end points, and a protection connection path, which is another traffic path between end points, for protecting the working connection path.

Figure 3:
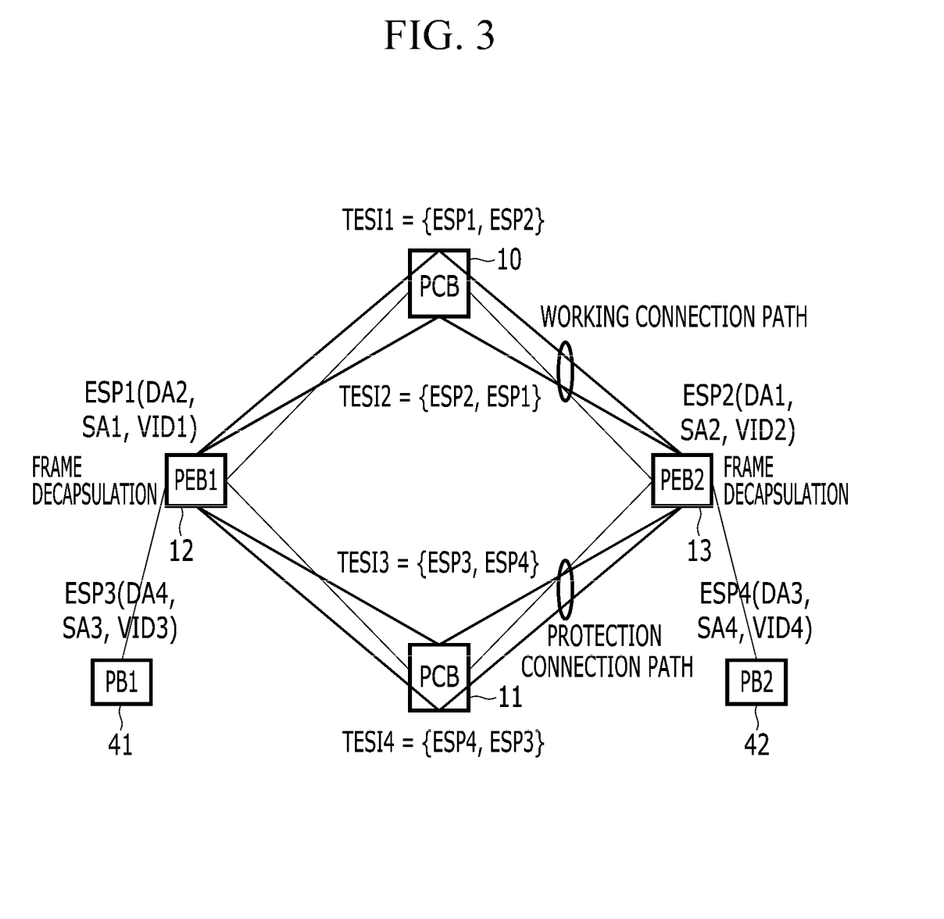
FIG. 3 is a diagram illustrating connection paths according to an exemplary embodiment of the present invention.

FIG. 3 is a diagram illustrating connection paths according to an exemplary embodiment of the present invention.

As shown in FIG. 3, connection paths according to an exemplary embodiment of the present invention include an ESP1, which is a connection path of a PEB2 13 direction in a PEB1 12, an ESP2, which is a connection path of the PEB1 12 direction in the PEB2 13, an ESP3, which is a connection path of the PEB2 13 direction in the PEB1 12, and an ESP4, which is a connection path of the PEB1 12 direction in the PEB2 13. The ESP1 includes DA2, SA1, and VID1, the ESP2 includes DA1, SA2, and VID2, the ESP3 includes DA4, SA3, and VID3, and the ESP4 includes DA3, SA4, and VID4.

Connection paths for protection switching are Traffic Engineering Service Instances (TESI), and include TESI1, which is a working connection path of a PEB2 13 direction in the PEB1 12, TESI2, which is a working connection path of a PEB2 13 direction in the PEB2 13, TESI3, which is a protection connection path of the PEB2 13 direction in the PEB1 12, and TESI4, which is a protection connection path of the PEB1 12 direction in the PEB2 13.

TESI1={ESP1, ESP2}, TESI2={ESP2, ESP1}, TESI3={ESP3, ESP4}, and TESI4={ESP4, ESP3} are satisfied.

In a connection path that is formed in this way, a connection test message for checking a state of each connection path is exchanged between the PEB1 and the PEB2, which are end points of the working connection path and the protection connection path. When a failure is found in a connection test, the working connection path is switched to a protection connection path, and path switching may be performed within a time of, for example, 50 ms.

Figure 4:
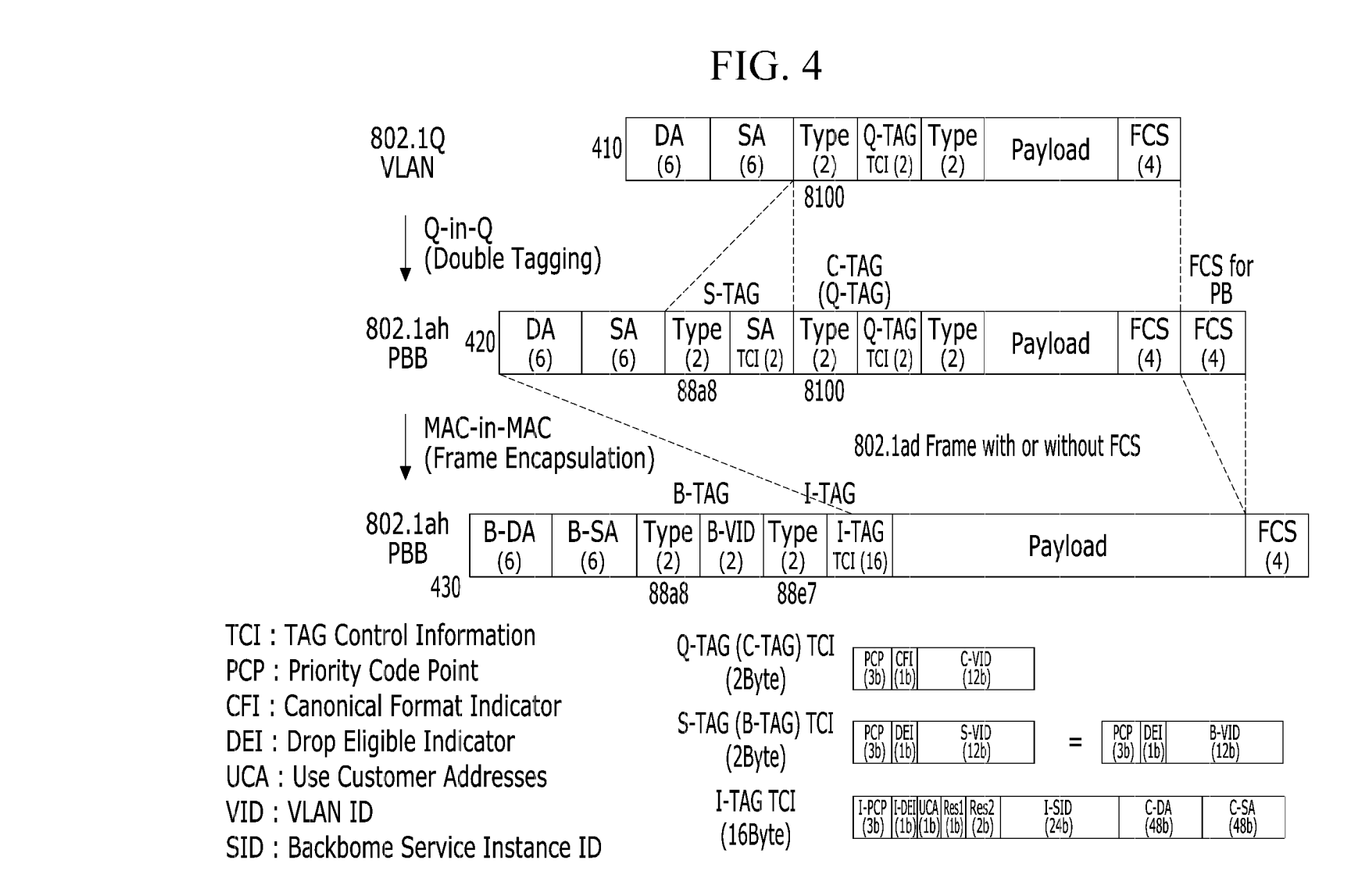
FIG. 4 is a diagram illustrating a structure of a data frame according to an exemplary embodiment of the present invention.

A data frame format according to an exemplary embodiment of the present invention has a structure of FIG. 4. FIG. 4 is a diagram illustrating a structure of a data frame according to an exemplary embodiment of the present invention.

As shown in FIG. 4, the VM 60 and the ToR switches 31-34 as an L2 data frame format that is applied to an exemplary embodiment of the present invention use a data frame having a first frame format (e.g., 802.1Q standard frame format), the PBs 41 and 42 use a data frame having a second frame format (e.g., 802.1ad standard frame format), and the PEBs 12 and 13 and the PCBs 10 and 11 use a data frame having a third frame format (e.g., 802.1ah standard frame format).

Hereinafter, a method of managing a connection path failure will be described.

Figure 5:
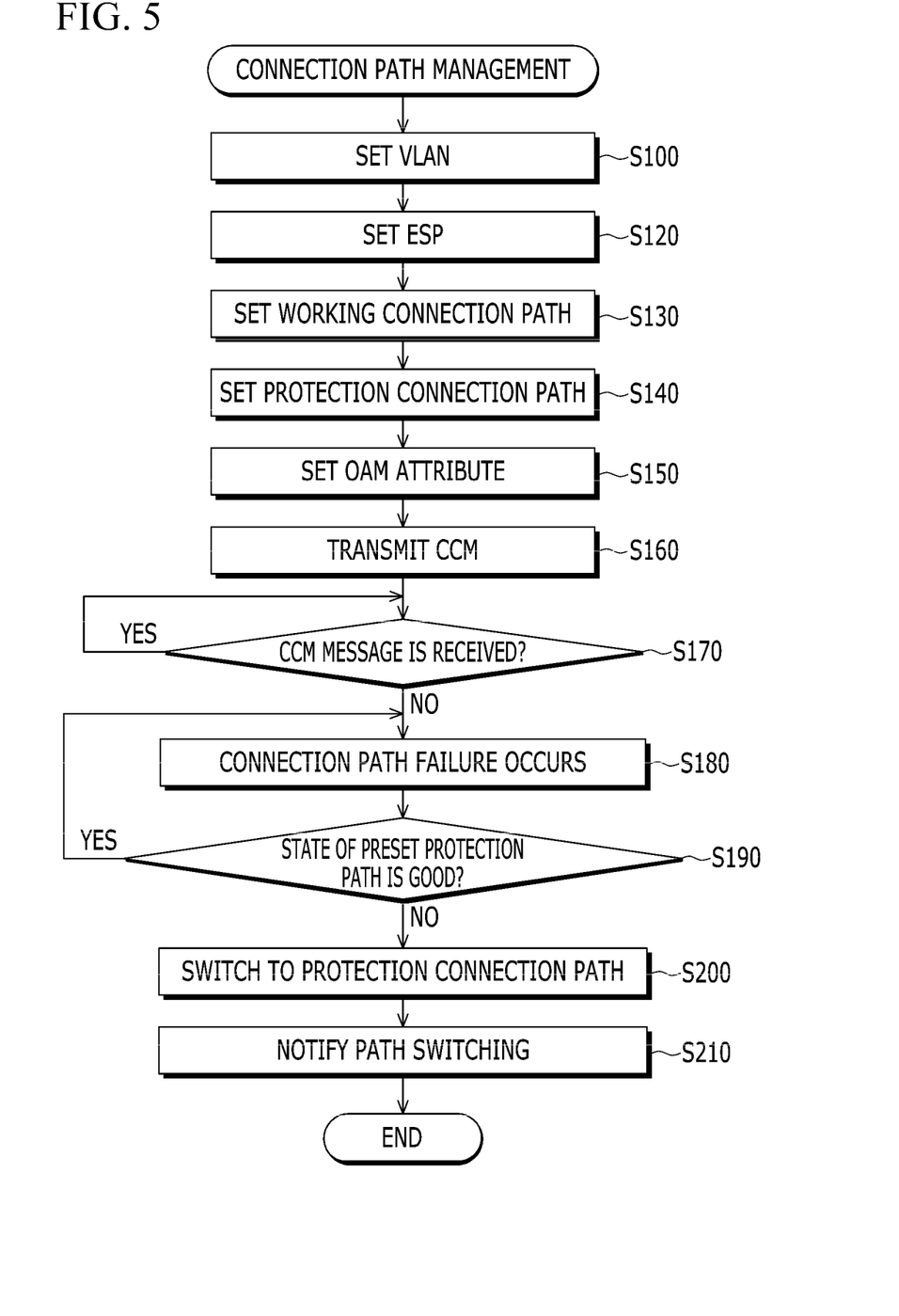
FIG. 5 is a flowchart illustrating a method of managing a data center connection path according to an exemplary embodiment of the present invention.

FIG. 5 is a flowchart illustrating a method of managing a data center connection path according to an exemplary embodiment of the present invention.

In order to set a connection path to a management target, i.e., ToR switches 31-34, PB devices 41 and 42, and PEBs 12 and 13, the cloud computing data center 1 sets a VLAN through a management agent (not shown) that is included in each management target. Specifically, a C-VLAN is set between the VM 60 and the ToR switches 31-34, an S-VLAN of the PB devices 41 and 42 is set, and an I-VLAN and a B-VLAN are set to the PEB and the PCB, respectively (S100).

Each VLAN sets ESP information including DA, SA, and VID (S120). Further, a working connection path, which is a traffic path between end points, and a protection connection path, which is another traffic path between end points for protecting the working connection path, are set (S130 and S140). The working connection path and the protection connection path include ESP connection information based on ESP information.

For operation management and maintenance that monitor and process a failure in connection paths, operation and maintenance (OAM) attributes including generation of a maintenance domain (MD), a maintenance association (MA), and a maintenance end point (ME) are set (S150). When the connection path and the OAM attribute are set, a continuity check message (CCM) is periodically exchanged between connection path maintenance end points (MEP) of connection paths (S160).

Each end point checks whether a CCM message is received within a predetermined time (S170) and each end point determines frame information of a message that is received within a predetermined time, and if a frame kind is a CCM, each end point determines a next CCM message.

If a CCM message is not received within a predetermined time or if frame information of the received message is not a CCM, it is determined that a connection path failure occurs, and thus the each end point transmits a connection path failure message to the NMS 20 (S180).

The end point that determines that a connection path failure has occurred checks whether a state of a preset protection connection path is good (S190), and if a failure does not exist in the protection connection path, each end point performs path switching to the protection connection path (S200). Thereafter, after path switching to the protection connection path is performed, a corresponding end point transmits a path switching message that notifies the NMS 20 of path switching (S210).

Figure 6:
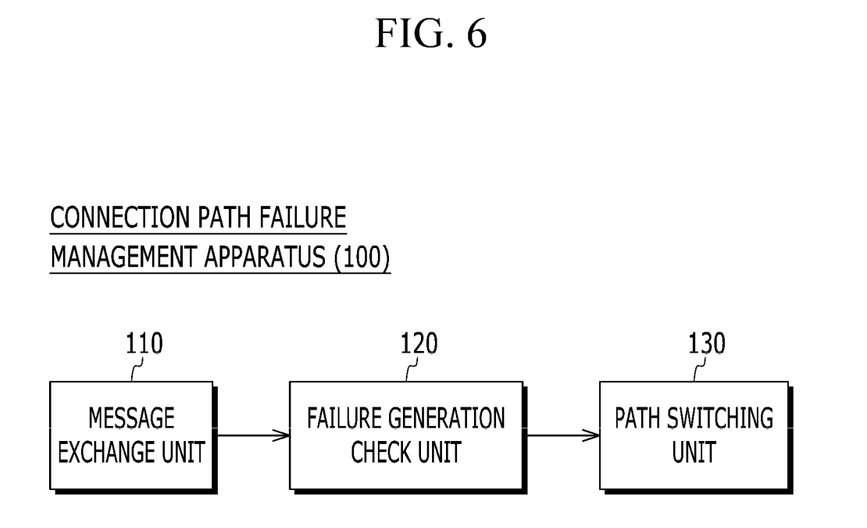
FIG. 6 is a block diagram illustrating a configuration of a connection path failure management apparatus according to an exemplary embodiment of the present invention.

FIG. 6 is a block diagram illustrating a configuration of a connection path failure management apparatus according to an exemplary embodiment of the present invention.

A connection path failure management apparatus 100 according to an exemplary embodiment of the present invention include a message exchange unit 110, a failure generation check unit 120, and a path switching unit 130. The message exchange unit 110 exchanges a test message, particularly, a CCM, with an end point that is connected to a corresponding working connection path through a working connection path.

When a test message is not received from a connected end point or when a frame of a received message does not correspond with test message frame information, the failure generation check unit 120 determines that a failure has occurred in a corresponding working connection path.

The path switching unit 130 switches a working connection path in which a failure has occurred to a protection connection path. The path switching unit 130 notifies that path switching was performed by transmitting a path switching message to the NMS 120.

According to an exemplary embodiment of the present invention, a connection path to another data center is set through a PBBN, and VM migration is rapidly performed through the set connection path. Further, even in a case where a failure occurs at a connection path, switching to a protection connection path can be rapidly performed.

Also, in a cloud computing service, as a provider backbone bridge is formed between data centers, a connection path for packet transmission is formed, and thus virtual machine migration and large capacity packet transmission between cloud computing data centers through the provider backbone bridge are quickly performed.

Further, whether a failure occurs in a connection path in which a provider backbone bridge is formed between data centers is monitored, and when a failure is found, by quickly switching the path to a protection path, traffic damage is minimized, and thus cloud service continuity and reliability can be provided.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing a connection path failure, wherein a first cloud computing data center and a second cloud computing data center are connected through a provider backbone bridge network (PBBN), the method comprising:
    forming a first plurality of working connection paths and protection connection paths, through the PBBN, between an end point of the first cloud computing data center and an end point of the second cloud computing data center;
    forming a second plurality of working connection paths and protection connection paths between end points within one of the first and second cloud computing data center;
    exchanging a test message between the end points of the first cloud computing data center and the second cloud computing data center that are connected to a first working connection path among the first plurality of working connection paths and protection connection paths;
    determining that a failure has occurred at the first working connection path when the test message is not received at one of the end points connected to the first working connection path; and
    switching the first working connection path in which the failure has occurred to a first protection connection path among the first plurality of working connection paths and protection connection paths,
    wherein each of the first data center and second data center comprises a provider bridge (PB) device that is connected to the PBBN and a switch that is connected to a plurality of servers comprising a plurality of virtual machines (VM), and
    wherein the forming of the first plurality of working connection paths and protection connection paths between the end points of the first cloud computing data center and the second cloud computing data center comprises forming a connection path based on a first virtual local access network (VLAN) between the VM and the switch, a second VLAN of the PB device, and a third VLAN and a backbone service instance ID (I-SID) of a provider edge bridge (PEB) and a provider core bridge (PCB) included in the PBBN, wherein the connection path is one of at least one working connection path and at least one protection connection path between the end points of the first cloud computing data center and the second cloud computing data center.

2. The method of claim 1, wherein Ethernet switched path (ESP) information comprising a destination address, a source address, and a VLAN identifier (VID) is allocated to the each VLAN.

3. The method of claim 1, wherein the forming of a plurality of working connection paths of said first plurality further comprises setting operation and maintenance (OAM) attributes comprising generation of a maintenance domain (MD), a maintenance association (MA), and a maintenance end point (ME) to the plurality of working connection paths.

4. The method of claim 1, wherein the switching of the first working connection path comprises transmitting, by said one of the end points connected to the first working connection path, a message representing that the first working connection path is switched to the first protection connection path, to a network management system (NMS) of the first cloud computing data center or the second cloud computing data center, depending on which of the first and second cloud computing data centers includes said one of the end points of the first working connection path.

5. The method of claim 1, wherein the test message is formed with a continuity check message (CCM) and is periodically exchanged between the end points.

6. An apparatus that manages a connection path failure at a random end point that is positioned within a cloud computing data center,
    wherein the cloud computing data center is connected to another data center through a provider backbone bridge network (PBBN), and
    wherein a first plurality of working connection paths and protection connection paths are formed between the random end point and another end point within the cloud computing data center,
    or
    a second plurality of working connection paths and protection connection paths are formed between the random end point and another end point within the other data center through the PBBN, the apparatus comprising:
    a message exchange unit that exchanges a test message with a corresponding end point within the cloud computing data center or the other data center that is connected to the random end point through a corresponding working connection path;
    a failure generation check unit that determines that a failure has occurred in the corresponding working connection path when the test message is not received from the corresponding end point; and
    a path switching unit that switches the corresponding working connection path to a corresponding protection connection path,
    wherein the cloud computing data center comprises a provider bridge (PB) device that is connected to the PBBN and a switch that is connected to a plurality of servers comprising a plurality of virtual machines (VMs), and at least the corresponding working connection path is formed based on a first virtual local access network (VLAN) between the VM and the switch, a second VLAN of the PB device, and a third VLAN and a backbone service instance ID (I-SID) of a provider edge bridge (PEB) and a provider core bridge (PCB) that are included in the PBBN.

7. The apparatus of claim 6, wherein the failure generation check unit determines that the failure has occurred in the corresponding working connection path when the test message is not received at the random end point within a preset time or when a kind of a frame of the received message does not correspond to a kind of the test message.

8. The apparatus of claim 6, wherein the path switching unit notifies a management system of the cloud computing data center of a message representing that a path is switched from a working connection path between end points within the cloud computing data center, or between an end point within the cloud computing data center and an end point within the other data center through the PBBN in which a failure has occurred to a protection connection path between end points within the cloud computing data center, or between an end point within the cloud computing data center and an end point within the other data center through the PBBN.

* * * * *